Nov. 11, 1952  R. E. HARTLINE  2,617,716
COMBUSTIBLE GAS ANALYZING APPARATUS
Filed Jan. 17, 1950

INVENTOR.
Ralph E. Hartline
BY Paul F. Hawley
Attorney

Patented Nov. 11, 1952

2,617,716

UNITED STATES PATENT OFFICE 2,617,716

COMBUSTIBLE GAS ANALYZING APPARATUS

Ralph E. Hartline, Tulsa, Okla., assignor to Stanolind Oil and Gas Company, Tulsa, Okla., a corporation of Delaware Application January 17, 1950, Serial No. 139,041

4 Claims. (Cl. 23—255)

This invention pertains to a method and means for analyzing a gaseous mixture for combustible components. More specifically, it has application to combustible-gas indicators involving a heating element, usually a filament heated to such a temperature that under certain conditions there is combustion adjacent the filament which produces an anomalous heating condition at the heating element which may be detected.

It is an object of this invention to provide an improved combustible-gas indicator. It is a further object of this invention to provide a portable gas indicator employing a cyclically periodically heated filament which has negligible zero drift of its signal output under operation, particularly under continuous operation. Further objects and advantages of this invention will be apparent from this specification.

One type of combustible-gas indicator employs a filament heated by the current of an associated measuring circuit, such as, for example, a Wheatstone bridge. The filament is heated to a temperature sufficiently high so that under conditions combustion of any flammable component of the sample occurs adjacent the filament surface as the same is brought into contact with the filament. This local combustion increases the filament temperature beyond the temperature produced by the electric current and hence alters the filament resistance. Such change in filament resistance (usually an increase) is employed to actuate a measuring circuit to give an indication which may be calibrated in terms of the concentration of the flammable component.

Such indicators are subject to a common difficulty, namely, that changes in ambient temperature of the combustible-gas sample or in the supply of voltage feeding the heating element produce variations in the output which may be misinterpreted as changes in flammable concentration of the gas. Circuit stability is commonly obtained by adding a compensating filament similar to that in the detector element to the measuring circuit as, for example, in an adjacent arm of the Wheatstone bridge. Changes in ambient temperature or in the supply voltage produce similar changes in the two filaments, but their location in the circuit is such as to produce oppositely acting response on the indicating meter. The circuit is therefore somewhat stabilized. Combustion on the compensator filament is prevented by not exposing the compensator to sample flow or by operating it at a lower temperature. Instruments of this character are described, for example, in U. S. Patents 2,279,397 and 2,244,366.

These and all other indicators of the type presently known in the art are subject to a drift of the zero point which under some conditions of operation (particularly when detecting mixtures of air and flammable gases of high ignition temperatures) becomes quite serious. Satisfactory operation of the heating element or detector filament in the combustion of the higher-ignition-temperature flammable gases, as, for example, methane, requires that it operate at a relatively high temperature. In the usual compensated detector involving series operation of the detector and compensator filaments in the bridge circuit, a decrease of detector-filament resistance with age results in a decrease in the detector (and the compensator) current. The introduction of a flammable vapor increases the detector temperature, raising its resistance, and thus lowers the drop across the compensator. Since the rate of evaporation of material from a metallic-filament heating element increases rapidly with increasing temperature, the detector-filament resistance increases at a rate with time considerably greater than that of the compensator filament. This gradual increase in the detector heating-element resistance with age is undistinguishable from a similar increase resulting from gradual increase in the flammable content of the gas. Accordingly, it becomes necessary periodically to readjust the zero or balance the measuring circuit to correct for this aging of the detector heating element. The same result can occur due to high concentration of the flammable constituents of the measured gas over a considerable time.

Shifts of the zero also result from changes in the thermal conductivity and volumetric specific heat of the sample when only the detector is exposed to the sample flow. Partial compensation is accomplished when the compensator is deactivated and exposed to the sample flow.

I have found that the heating element of a combustible-gas indicator is inactive as a combustion catalyst below a certain threshold temperature which could also be called the minimum combustion temperature for the gas. Once local combustion starts at this minimum combustion temperature, the increased heat generated increases the filament temperature, which in turn increases the combustion. This effect is accumulative, and the process continues until a temperature increase no longer results in an increase in combustion. Accordingly, if the filament is operated in a cyclical temperature pattern so that during a large part of the time it operates below the minimum combustion temperature of the gas present, relatively it will not be subject to evaporation and accordingly will experience negligible zero drift. Even if the filament evaporates in part, there still will be negligible zero drift, as will appear from consideration of the detection system. This temperature variation can be achieved by supplying a cyclically varying current to the detector heating element. A varying direct current or alternating current or preferably a combination of the two in which the peak alternating current is less than the direct current can be employed. The frequency of variation of the heating is chosen low enough so that the filament thermal time lag is reasonably small as compared to the period of the variation in temperature. The filament temperature then tends to follow the variation of the square of the heating current. This heating current is chosen such that the heating-element temperature goes through an excursion from a range below the minimum combustion temperature to a temperature above this value and preferably substantially above this value. The detection circuit operates on an anomalous variation in the resistance of the heating element which occurs when local combustion of the flammable components of the gas being tested occurs at or close to the heating-element surface. It will appear from this specification that there is what might be called a hysteresis effect in filament resistance as the filament current is changed whenever local combustion takes place. This hysteresis effect distorts the voltage drop across the heating element and accordingly varies the harmonic content of this voltage, which in turn can be detected by suitable means.

In order to illustrate the principles involved more completely, certain figures are attached to this specification and made a part thereof. It is to be understood that these are merely by way of illustration and do not limit the scope of the invention. In these drawings.

Figure 1:
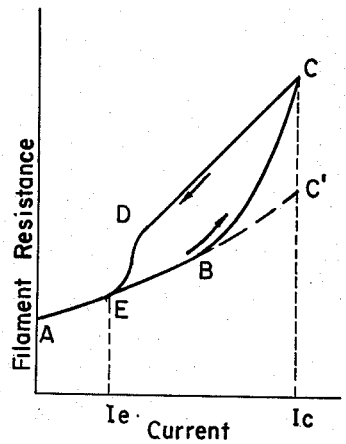
Figure 1 is a diagram of the change of filament resistance with current during one cycle of operation of the detector.

Consider in connection with Figure 1 a variation in current through a filament exposed to a combustible gas. At zero current, such a heating element will have an electrical resistance as at point A. Increase in the heating current through the resistance increases this resistance along the path E—B. If no combustible gas were present, the resistance of the heating element would increase along some path B—C'. However, if the temperature corresponding to the filament resistance at point B is sufficient to cause a start of local combustion at the heating element, and if a combustible gas is present, there will be an increase in the temperature of the filament in excess of that produced by the heating current, and a consequent increase of filament resistance which, as discussed above, will cause usually a further increase in combustion, so that the resistance increases to some value C. Upon lowering the filament current, the filament temperature will decrease along the path C—D, since under the flow of combustible gas there is still local combustion until the temperature decreases to such a value that the filament is below the minimum combustion temperature of the gas. This will occur at a point D on the variation of filament resistance plot, which is approximately the same resistance of the filament as at the point B at which local combustion began. The filament resistance will then drop relatively rapidly until at some point E it comes back to the original curve A—E—B.

The net results could be termed a thermal or resistance hysteresis loop around the values E—B—C—D—E as the filament current is varied over a range including a temperature corresponding to the minimum combustion temperature of the gas present. Operation over this loop will occur only in the presence of a combustible vapor, and, if the flammable content decreases to zero, operation of the heating current over values $I_e$ to $I_c$, corresponding to the variation from E to C', will cause no such variation in filament resistance, and the retrace of the filament resistance against current will be along C'—B—E. Accordingly, if a varying current is applied which will vary between the limits corresponding to points E (current $I_e$), and C or C' (current $I_c$), a circuit measuring the abnormal variation in resistance along the path B—C will detect the presence of this combustible gas.

Obviously, the wave form of the applied current is not limited. The type of detector circuit employed determines the character of the cyclically varying generating means used to vary the heating element through the temperature range from below to above the minimum combustion temperature of said gas. The responsive means has the requirement on it that it produce an indication upon the heating of the heating element by local combustion of the combustible gas only.

Figure 2:
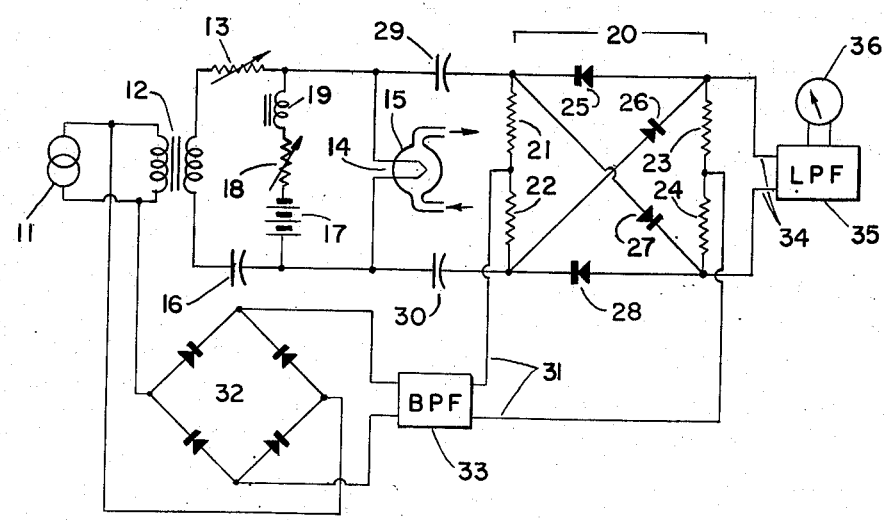
Figure 2 is a circuit diagram of one complete form of the combustible-gas detector.

One advantageous type of heating current which can be employed can be considered to be a combination of a constant direct current with a superimposed alternating current, preferably with a peak value less than that of the direct current. The application of this varying current to the filament with a period of the alternating current at least an appreciable fraction of and preferably large compared to the time lag of the filament produces a cyclic variation in filament resistance which in the presence of a non-flammable gas would vary between points such as E (corresponding to current $I_e$) and C' (corresponding to current $I_c$). The introduction of a combustible constituent in the vicinity of the filament results in an increase in the filament resistance above point B, resulting in a marked increase of the harmonic content of the total voltage or voltage drop across the heating element. By employing a detection circuit which produces an indication which is responsive to the changes of harmonic content of the voltage drop across the heating circuit, a combustible-gas detector is produced which has negligible zero shift. The increase in harmonic content of the voltage across the heating element, it is apparent, is an increase in the even harmonics of the alternating-current component of the heat current. Any detector which produces an output indication responsive to an increase in one or more of the even harmonics of the voltage drop across the heating element can be employed as the indicating element in the gas detector. One convenient arrangement of circuit elements to accomplish this is shown in Figure 2.

In this figure, an alternating-current generator 11 is applied through a transformer 12 and current-adjusting resistance 13 to a heating element or filament 14 in a chamber 15 through which the gas to be detected is conducted. A blocking condenser 16 completes this alternating-current part of the heating circuit. A battery 17 supplied with an adjustable resistor 18 and a blocking choke 19 also supplies heating current to the heating element 14. Preferably, the adjustment of resistor 18 is such that a temperature is produced in heating element 14 which is near or below the minimum combustion temperature of any composition of gas with which this detector is to be employed. Resistor 13 preferably is adjusted so that the peak value of the alternating current through a resistor 14 is less than the current from battery 17, thus producing a variation in heating current through resistor 14 from a minimum value (corresponding to $I_e$) to a maximum value (corresponding to $I_c$), the maximum value producing a temperature in the heating element above the minimum combustion temperature of the gas to be detected. This can be determined by passing alternately non-combustible and combustible gases through the chamber 15 and noting the variation in the output of this circuit.

The output circuit or detector means in the circuit shown consists of a balanced modulator indicated generally by numeral 20 and composed of resistors 21 and 22 of substantially equal value, resistors 23 and 24, also of substantially equal value, and rectifiers 25, 26, 27, and 28. This modulator is coupled, for example, by coupling condensers 29 and 30 across the heating element 14 and is thus responsive to variations in voltage drop across this element. Alternating current applied across condensers 29 and 30 produces no voltage drop across the outside end of resistors 23 and 24 in the absence of a biasing voltage across conductors 31. As is well known in the theory of balanced modulators, if a current of frequency $f$ is applied across conductors 31, the peak value of which is substantially greater than that of any voltage applied from heating element 14, the direct component of voltage output across the outside terminals of resistors 23 and 24 is proportional to the component of input voltage at the frequency $f$.

Since in this circuit the detection element is operating on an increase in even-harmonic content of the voltage drop across resistor 14, a frequency $f$ across the conductors 31 which is any even multiple of the frequency of generator 11 could be employed. I prefer to use the second harmonic of generator 11, and accordingly produce, by the full-wave rectifier 32 and band-pass filter 33 tuned to twice the frequency of generator 11, a bias voltage across conductors 31 at twice the frequency of generator 11 and at least approximately in phase with the second harmonic voltage across element 14. Thus, across conductors 34 will appear a direct voltage proportional to the second harmonic voltage drop across heating element 14. This voltage, preferably but not necessarily filtered through a low-pass filter 35, which rejects preferably all but the direct component of the voltage across conductors 34, is applied to an indicator which may be a meter 36, an oscillograph element, or other means of detecting current flow. This circuit then will respond to the second harmonic voltage generated across the heating element 14 due to local combustion of the flammable materials above a minimum combustion temperature of the combustible gas.

Figure 3:
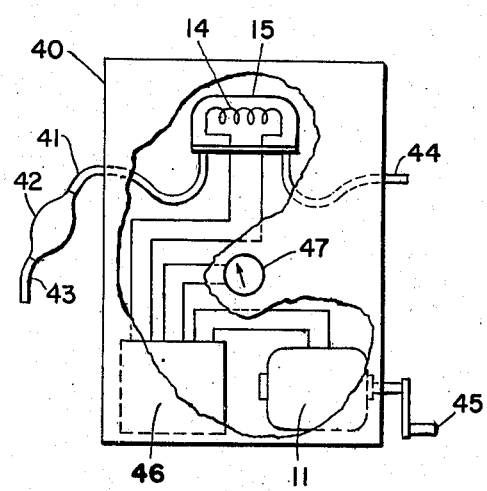
Figure 3 is a view of the physical arrangement of apparatus in one such detector of the type of which the circuit diagram is given in Figure 2.

The physical form of such apparatus as that shown in Figure 2 or its obvious equivalents depends upon the use to which the detector is to be put. For example, one convenient form of gas detector is shown in Figure 3. Here, a case 40 carries the chamber 15 in which is located the heating element 14. The combustible gas to be detected is conducted to chamber 14 through duct 41, aspirator bulb 42, and duct 43. By squeezing on bulb 42, a charge of the gas entering duct 43 is conducted over the cyclically heated element 14 and passed out through duct 44. Since the frequency of generator 11 should be relatively low, preferably of the order of less than 10 and particularly advantageously below 5 cycles per second, a high-inertia, hand-cranked generator crank 45 is mounted in the lower part of the case adjacent the circuit elements, which are generally indicated in removable container 46 mounted in case 40. The circuit components in case 46 may be, for example, those shown in Figure 2. Such a case can be usually transported by one man to a region in which combustible gas is to be detected and operated there. The results of the operations are shown on the face of meter 47, which is equivalent to meter 36 of Figure 2.

If the combustible-gas indicator is to be used in a well for geochemical analysis or the like, it is obvious that a different form of case would be used and a motor-driven gas pump would be employed instead of the bulb 42. As has been stated, the equipment which has been described in detail and the method of employment of such types of equipment has been by way of illustration. The scope of the invention is best defined by the scope of the appended claims.

I claim:

1. In combustible-gas detectors, the combination comprising a heating element, means for exposing said element to a combustible gas to be detected, an alternating-current generator connected to said element and cyclically heating said element through a temperature range from below to above the minimum combustion temperature of said gas, whereby the resistance of said element changes during each cycle, and a harmonic analyzer electric detector responsive to variations in voltage drop of said element only at a multiple of the frequency of said generator, said detector producing an indication upon heating of said element by local combustion of said gas.

2. In combustible-gas detectors, the combination comprising a heating element, means for exposing said element to a combustible gas to be detected, an alternating-current generator and a direct-current source both passing current through said element whereby the temperature of said element varies each cycle through a temperature range including the minimum combustion temperature of said gas, and electric harmonic analyzer means for indicating a quantity proportional to an even harmonic of the voltage variation produced in said element by said alternating-current generator.

3. In combustible-gas detectors, the combination comprising a heating element, means for exposing said element to a combustible gas to be detected, a low-frequency alternating-current generator and a direct-current source both passing current through said element with peak alternating current less than the direct current supplied to said element whereby the temperature of said element varies each cycle through a temperature range including the minimum combustion temperature of said gas, and a harmonic analyzer indicator circuit the input to which is coupled to said element and the output of which produces an indication proportional to the voltage across said element of frequency equal to the second harmonic of said generator.

4. In combustible-gas detectors, the combination comprising a heating element, means for exposing said element to a combustible gas to be detected, a low-frequency alternating-current generator and a direct-current source both passing current through said element with the peak alternating current less than the direct current supplied to said element whereby the temperature of said element varies each cycle through a temperature range including the minimum combustion temperature of said gas, and an indicator circuit including a double balanced modulator the input to which is coupled to said element and the output of which coupled to a low frequency current indicator, said modulator being supplied with modulator voltage at a frequency equal to the second harmonic of said generator.

RALPH E. HARTLINE.

REFERENCES CITED

The following references are of record in the file of this patent:

UNITED STATES PATENTS

| Number | Name | Date |
|---|---|---|
| 2,219,391 | Jacobson | Oct. 29, 1940 |
| 2,219,540 | Miller | Oct. 29, 1940 |
| 2,335,032 | Sullivan | Nov. 23, 1943 |
| 2,369,811 | Stuart | Feb. 20, 1945 |
| 2,412,827 | Morgan et al. | Dec. 17, 1946 |
| 2,521,130 | Scherbatskoy | Sept. 5, 1950 |

FOREIGN PATENTS

| Number | Country | Date |
|---|---|---|
| 279,478 | Great Britain | Feb. 20, 1929 |

OTHER REFERENCES

Carruthers, R. S., "Copper Oxide Modulators in Carrier Telephone Systems," published in Bell System Technical Journal, vol. 18, pages 315–337 (1939).

Lawrence, R. R., "Principles of Alternating Currents," McGraw-Hill Book Co., pages 72–79 (1922).